(12) United States Patent
Beutel et al.

(10) Patent No.: US 9,899,685 B2
(45) Date of Patent: *Feb. 20, 2018

(54) METHOD OF MAKING A PROTON EXCHANGE MEMBRANE USING A GAS DIFFUSION ELECTRODE AS A SUBSTRATE

(71) Applicant: GM GLOBAL TECHNOLOGY OPERATIONS LLC, Detroit, MI (US)

(72) Inventors: Matthew J Beutel, Webster, NY (US); Timothy J Fuller, Pittsford, NY (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/458,512

(22) Filed: Mar. 14, 2017

(65) Prior Publication Data

US 2017/0187044 A1 Jun. 29, 2017

Related U.S. Application Data

(63) Continuation of application No. 11/972,817, filed on Jan. 11, 2018, now Pat. No. 9,647,274.

(51) Int. Cl.
| | |
|---|---|
| *H01M 4/88* | (2006.01) |
| *H01M 8/1069* | (2016.01) |
| *H01M 8/1004* | (2016.01) |
| *H01M 8/1018* | (2016.01) |

(52) U.S. Cl.
CPC ....... *H01M 4/8825* (2013.01); *H01M 4/8892* (2013.01); *H01M 8/1004* (2013.01); *H01M 8/1069* (2013.01); *H01M 2008/1095* (2013.01)

(58) Field of Classification Search
CPC ............. H01M 4/8825; H01M 4/8892; H01M 8/1004; H01M 2008/1095
See application file for complete search history.

(56) References Cited

U.S. PATENT DOCUMENTS

| | | |
|---|---|---|
| 5,318,863 A | 6/1994 | Dhar |
| 7,217,471 B2 | 5/2007 | Wald et al. |
| 2004/0209965 A1* | 10/2004 | Gascoyne ........... H01M 8/0289 521/27 |
| 2004/0214064 A1* | 10/2004 | Cavalca .............. H01M 4/8828 429/480 |
| 2005/0019649 A1* | 1/2005 | Kakutani ............ H01M 4/8605 429/128 |
| 2005/0164072 A1* | 7/2005 | Yan .......................... C25B 9/10 429/483 |
| 2005/0233067 A1* | 10/2005 | Gascoyne ........... H01M 4/8605 427/115 |
| 2007/0087245 A1 | 4/2007 | Fuller et al. |
| 2008/0102349 A1* | 5/2008 | Lee ..................... H01M 4/8657 429/480 |
| 2008/0143061 A1* | 6/2008 | Steinbach ........... H01M 8/0202 277/654 |
| 2009/0117437 A1 | 5/2009 | Liu et al. |

FOREIGN PATENT DOCUMENTS

| | | |
|---|---|---|
| CN | 1108818 A | 9/1995 |
| CN | 1414652 A | 4/2003 |
| CN | 1613162 A | 5/2005 |
| CN | 1669166 A | 9/2005 |
| CN | 1949570 A | 4/2007 |
| CN | 1949574 A | 4/2007 |
| CN | 101212054 A | 7/2008 |
| CN | 10425583 A | 5/2009 |
| WO | WO2003100894 A2 | 12/2003 |
| WO | WO2007014236 A2 | 2/2007 |

* cited by examiner

*Primary Examiner* — Alex Usyatinsky (74) *Attorney, Agent, or Firm* — General Motors LLC Legal Staff (57) ABSTRACT

One embodiment includes a method comprising the steps of providing a first dry catalyst coated gas diffusion media layer, depositing a wet first proton exchange membrane layer over the first catalyst coated gas diffusion media layer to form a first proton exchange membrane layer; providing a second dry catalyst coated gas diffusion media layer; contacting the second dry catalyst coated gas diffusion media layer with the first proton exchange membrane layer; and hot pressing together the first and second dry catalyst coated gas diffusion media layers with the wet proton exchange membrane layer therebetween.

8 Claims, 9 Drawing Sheets

METHOD OF MAKING A PROTON EXCHANGE MEMBRANE USING A GAS DIFFUSION ELECTRODE AS A SUBSTRATE

CROSS-REFERENCE TO RELATED APPLICATIONS

This patent application is a continuation application of U.S. Ser. No. 11/972,817 filed on Jan. 11, 2008.

TECHNICAL FIELD

This disclosure relates generally to membrane electrode assemblies.

BACKGROUND

Hydrogen is a very attractive fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines. A hydrogen fuel cell is an electrochemical device that includes an anode and a cathode with an electrolyte between the anode and the cathode. The anode receives hydrogen-rich gas or pure hydrogen and the cathode receives oxygen or air. The hydrogen gas is dissociated in the anode to generate free protons and electrons. The protons pass through the electrolyte to the cathode, where the protons react with the oxygen and the electrons in the cathode to generate water. The electrons from the anode are unable to pass through the electrolyte. Therefore, the electrons are directed through a load to perform work before they are sent to the cathode. The work may be used, for example, to operate a vehicle.

Proton exchange membrane fuel cells generally include a solid polymer electrolyte proton conducting membrane, such as a perfluorosulfonic acid membrane. The anode and the cathode typically include finely divided catalytic particles supported on carbon particles and mixed with an ionomer and a solvent. The combination of the anode, cathode and membrane define a membrane electrode assembly (MEA). The MEA may also include gas diffusion media, a porous layer that is necessary for gas and water transport through the MEA. The catalyst layer may be coated on the diffusion media, for example the catalyst layer may be rolled or painted or sprayed on the diffusion media as a slurry, and then compressed. It is known in the art to sandwich the membrane between two pieces of the catalyst coated diffusion media with the catalyst sides facing the membrane, and then to hot-press to bond the catalyst coated diffusion media to the membrane.

SUMMARY

One embodiment includes a method comprising providing a first catalyst coated gas diffusion media layer, depositing a wet first proton exchange membrane layer over the first catalyst coated gas diffusion media layer to form a first proton exchange membrane layer; providing a second catalyst coated gas diffusion media layer; contacting the second catalyst coated gas diffusion media layer, or second proton exchange membrane layer, with the first proton exchange membrane layer; and hot pressing together the catalyst coated diffusion layers and proton exchange membrane layer(s).

Other exemplary embodiments of the invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings.

DETAILED DESCRIPTION

The following description of the embodiments is merely exemplary in nature and is in no way intended to limit the invention, its application, or uses.

In one embodiment of the invention, a method is provided by which a proton exchange membrane is made using a catalyst coated gas diffusion electrode as a substrate.

Figure 1:
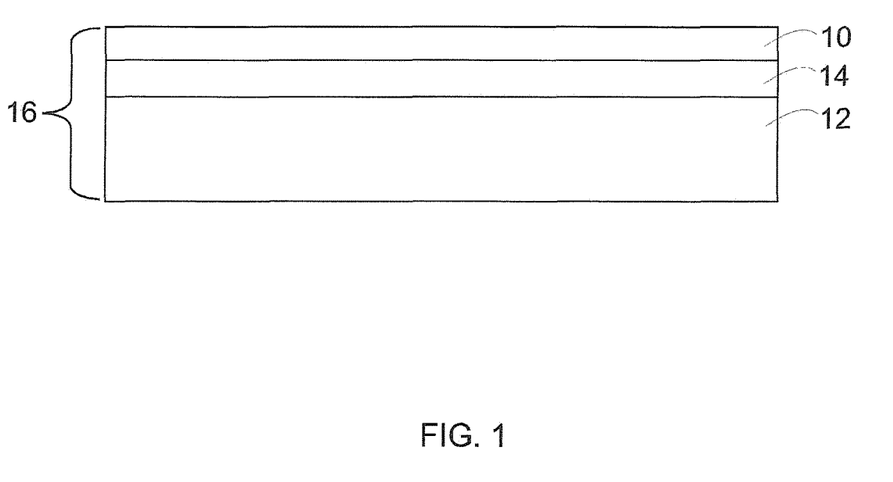
FIG. 1 illustrates a method according to one embodiment of the invention.

In one embodiment of the invention, a first catalyst layer 10 is applied to a first gas diffusion media layer 12 to form a first catalyst coated gas diffusion media layer 16. The first catalyst layer 10 may include suitable catalytic particles, for example, metals such as platinum, platinum alloys, and other catalysts known to those skilled in the fuel cell art. The first gas diffusion media layer 12 may be a conventional fuel cell gas diffusion material such as nonwoven carbon fiber paper, woven carbon cloth, or carbon foam, for example. The applying of the catalyst layer 10 may include any suitable method of applying, for example, rolling, painting, or spraying. In another embodiment, as shown in FIG. 1, a first microporous layer 14 is applied to the first gas diffusion media layer 12 and the first catalyst layer 10 is applied over the first microporous layer 14 to form the first catalyst coated gas diffusion media layer 16. The applying of the first microporous layer 14 may include any suitable method of applying, for example, rolling or painting. The microporous layer 14 may include particles and a binder. Suitable particles For the microporous layer 14 may include, but are not limited to, graphitic, graphitized, or conductive carbon particles. Suitable binders for the microporous layer 14 may include at least one of polytetrafluoroethylene (PTFE), polyvinylidenefluoride (PVDF), fluoroethylene propylene (FEP), or other organic or inorganic hydrophobic materials.

Figure 2:
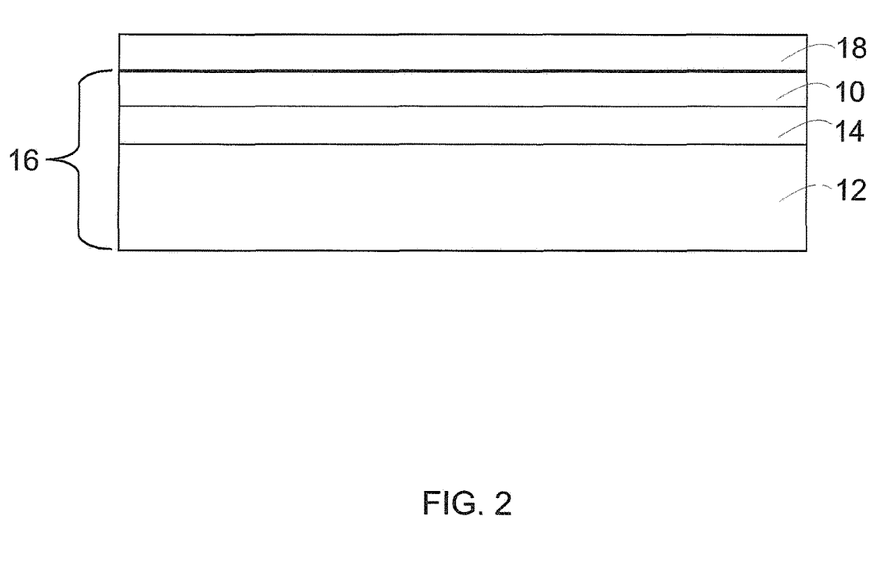
FIG. 2 illustrates a method according to one embodiment of the invention.

As shown in FIG. 2, in one embodiment a first wet proton exchange membrane layer is formed over the first catalyst coated gas diffusion media layer 16. The forming of the first wet proton exchange membrane layer may include any suitable technique, for example casting, laminating, imbibing, or spraying. The first wet proton exchange membrane may include a support or reinforcing sheet, for example a sheet of porous layer, for example expanded polytetrafluoroethylene (ePTFE) or Teflon. In another embodiment, the first wet proton exchange membrane may include a support including one of a porous material less than 30 µm thick, a paper less than 30 µm thick, polyolefins, polyethylene, polypropylene, polyesters, polyphenylene sulfide, or polymers with crystalline melting temperatures which do not dissolve in the coating solvents or dispersants used to imbibe an ionomer into the support material. The porous material or paper may be available from Crane and Co., Dalton, Mass. The polyethylene or polypropylene may be available from DSM or Tonen Chemical Nasu Co., Ltd., Japan. In one embodiment, the forming comprises casting, wherein a reinforcing sheet is evenly deposited over the catalyst layer 10 and an ionomer solution is applied over the reinforcing sheet. The ionomer solution may be, but is not limited to, an ionomer dispersion including Nation 1000 (20 wt %) in 40-48 wt. % 1-propanol and 30-38 wt. % water. The ionomer solution. May infiltrate or fill the pores of the reinforcing sheet. The ionomer solution may also penetrate at least one of the catalyst layer 10 and the microporous layer 14. In one embodiment, the ionomer solution may be heated to flash off the solvents and provide a dried solid polymer membrane reinforced by the ePTFE.

In another embodiment, the forming of the first wet proton exchange membrane comprises laminating, imbibing, or spraying, wherein the reinforcing sheet is immersed in the ionomer solution to form a wet membrane, and then this wet reinforced membrane is evenly deposited over the catalyst layer 10.

The first wet proton exchange membrane layer may be dried, for example under low pressure, to form a first proton exchange membrane layer 18.

In another embodiment, a multilayer coating including the catalyst layer 10 and the first proton exchange membrane layer 18 may be deposited over the first gas diffusion media layer 12. In another embodiment, the wet first microporous layer 14 is applied to the first gas diffusion media layer 12, dried, and sintered; the wet first catalyst layer 10 is applied to the first microporous layer 14; the first wet proton exchange membrane layer may be formed over the wet first catalyst layer 10; and all the layers may be dried simultaneously at the end of the process. The various methods described herein may eliminate the need for an additional proton exchange membrane layer substrate, for example polyethylene and polypropylene polymer based films, typically used in the manufacture and further processing of a proton exchange membrane layer. The various methods described herein are also an alternative to eliminate the need for a catalyst decal substrate, for example porous ePTFE, or a non-porous substrate film for example ethylene-tetrafluoroethylene (ETFE), and a hot press transfer step to transfer the catalyst layer 10 to the membrane as is typical with membrane electrode assembly (MEA) fabrication.

Figure 3:
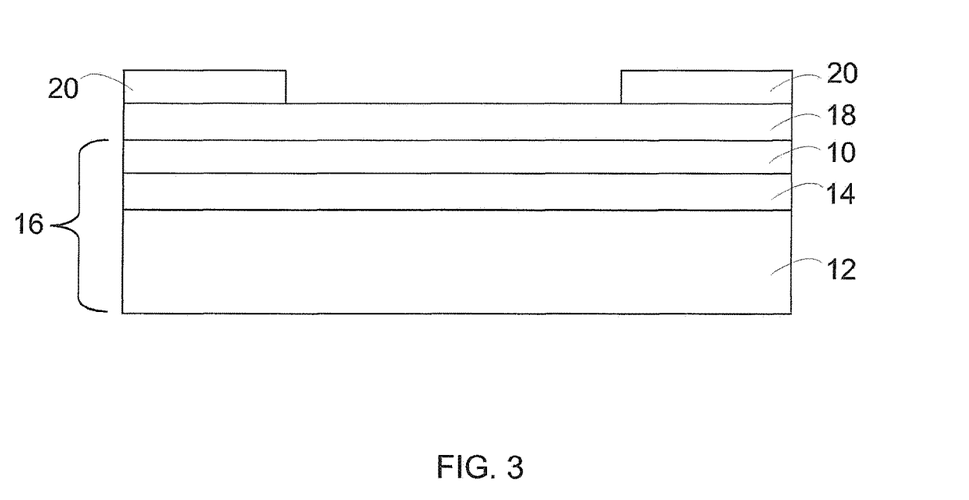
FIG. 3 illustrates a method according to one embodiment of the invention.

As shown in FIG. 3, in one embodiment a subgasket 20 may be deposited over the first proton exchange membrane layer 18. In one embodiment, a subgasket mater al or fluid may be deposited, cast, silk-screened, or molded over the first proton exchange membrane layer 18 and hardened, cured, or dried to form a subgasket 20. In another embodiment, the subgasket material or fluid may be cast, molded, or applied as a film sheet with cutouts to provide the electrochemically active area of the membrane electrode assembly. The subgasket may provide desired chemical, mechanical, and electrical properties and functions at the perimeter of the finished membrane electrode assembly and may also include an integral elastomeric type seal.

In one embodiment, the depositing of the wet proton exchange membrane layer over the catalyst coated gas diffusion media layer allows the membrane electrode assembly to be fabricated using continuous processing, for example, roll processing. In such a process, individual sheets of membrane over a catalyst coated diffusion media layer may be cut from a longer or continuous sheet. For example, the first catalyst coated gas diffusion media layer with the first proton exchange membrane layer thereon may be cut into at least two portions. The process may eliminate the need to handle sheets of vulnerable membranes and also reduces alignment steps. The process may eliminate the need to provide an additional substrate, for example a plastic or polymer film, for the purpose of fabricating or conveying the proton exchange membrane.

Figure 4A:
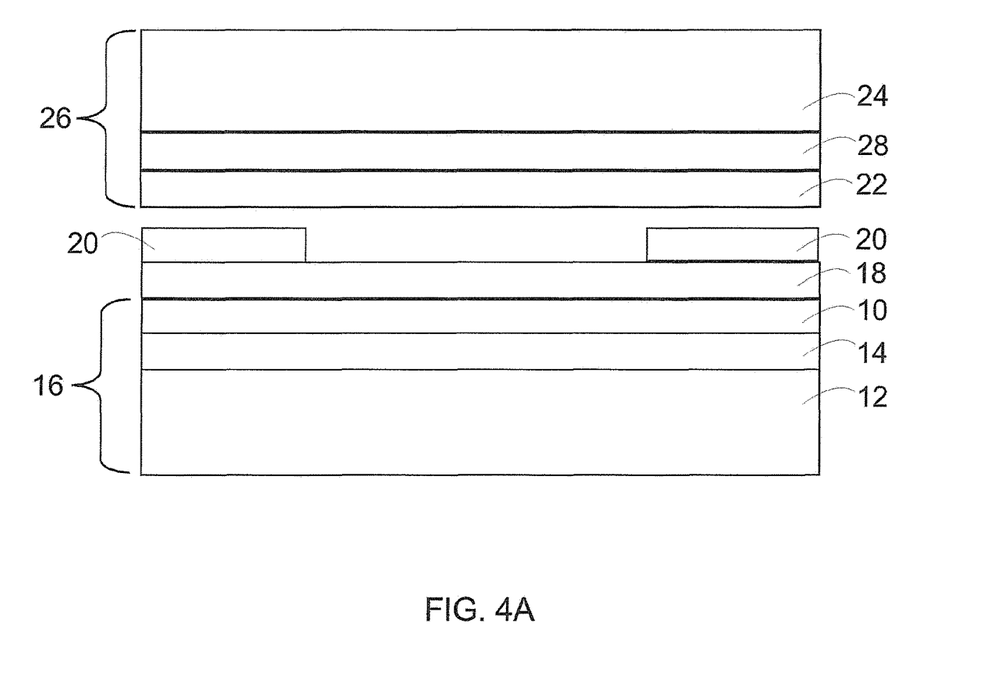
FIG. 4A illustrates a method according to one embodiment of the invention.

As shown in FIG. 4A, in one embodiment a second catalyst layer 22 is applied to a second gas diffusion media layer 24 to form a second catalyst coated gas diffusion media layer 26. At least a portion of the second catalyst layer 22 may be received in the cutout of the subgasket 20. The second catalyst layer 22 may include suitable catalytic particles, for example, metals such as platinum, platinum alloys, and other catalysts known to those skilled in the fuel cell art. The second gas diffusion media layer 24 may be a conventional fuel cell gas diffusion material such as nonwoven carbon fiber paper, woven carbon cloth, or carbon foam, for example. The applying of the second catalyst layer 22 may include any suitable method of applying, for example, rolling, painting, or spraying. In another embodiment, an optional second microporous layer 28 is applied to the second gas diffusion media layer 24 and the second catalyst layer 22 is applied over the second microporous layer 28 to form the second catalyst coated gas diffusion media layer 26. The microporous layer 28 may include particles and a binder. Suitable particles for the microporous layer 28 may include, but are not limited to, graphitic, graphitized, or conductive carbon particles. Suitable binders for the microporous layer 28 may include at least one of polytetrafluoroethylene (PTFE), polyvinylidenefluoride (PVDF), fluoroethylene propylene (FEP), or other organic or inorganic hydrophobic materials.

The applying of the second microporous layer 28 may include any suitable method of applying, for example, rolling, painting, or spraying. The second catalyst coated gas diffusion media layer 26 and the first proton exchange membrane layer 18 formed over the first catalyst coated gas diffusion media layer 16 may be hot pressed together. After hot pressing, the second catalyst coated gas diffusion media layer 26 and the first proton exchange membrane layer 18 formed over the first catalyst coated gas diffusion media layer 16 may be cut into at least two portions. Alternatively, individual sheets may be cut into at least two pieces before hot pressing. In one embodiment, before hot pressing, the subgaskets 20 are deposited over the first proton exchange membrane layer 18. In one embodiment, a subgasket material or fluid may be deposited, cast, or molded over the first proton exchange membrane layer 18 and hardened, cured, or dried to form a subgasket 20. In another embodiment, the subgasket material or fluid may be cast, molded, or applied as a film sheet with cutouts to provide the electrochemically active area of the membrane electrode assembly. The hot pressing results in a product 30 shown in FIG. 5. The process may eliminate the need to handle sheets of vulnerable membranes and also reduces alignment steps. The process may eliminate the need to provide an additional substrate, for example a plastic or polymer film, for the purpose of fabricating or conveying the proton exchange membrane.

Figure 4B:
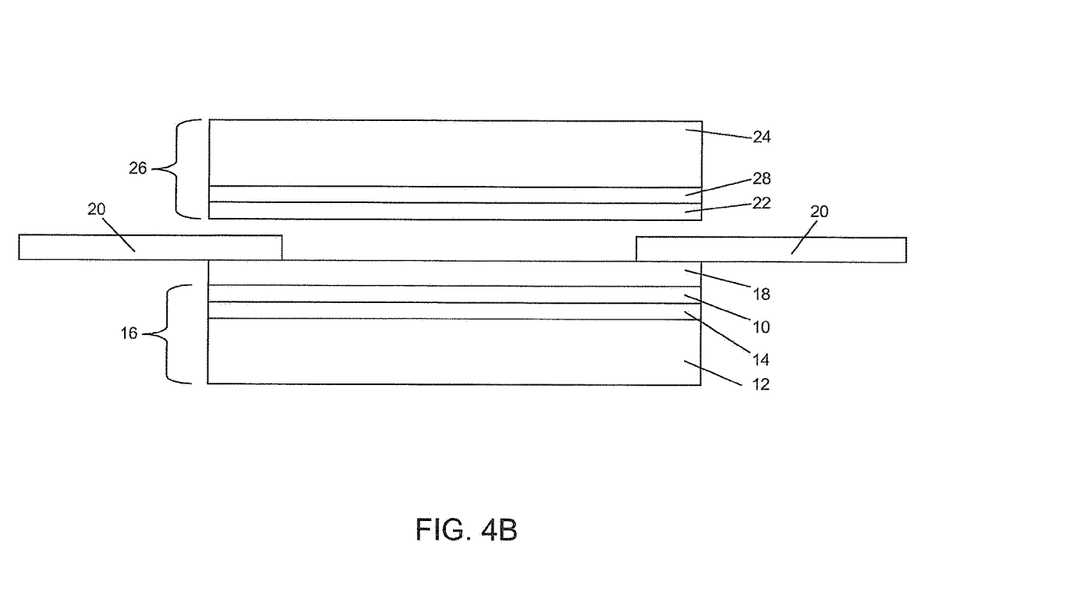
FIG. 4B illustrates a method according to one embodiment of the invention.
Figure 4C:
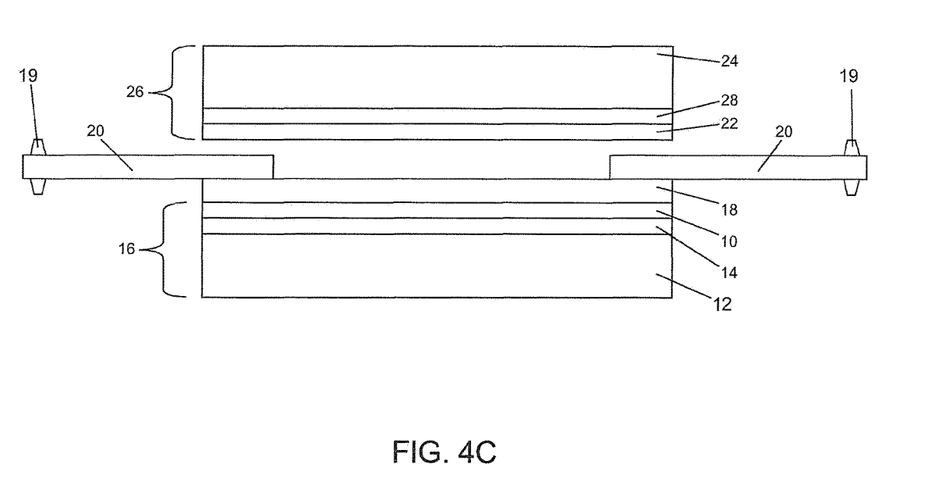
FIG. 4C illustrates a method according to one embodiment of the invention.

As shown in FIG. 4B, the subgasket 20 may extend past the edge of the first proton exchange membrane layer 18 and the first catalyst coated gas diffusion media layer 16. In another embodiment shown in FIG. 4C, an elastomer seal 19 may be provided in contact with the subgasket 20 extending past the edge of the first proton exchange membrane layer 18 and the first catalyst coated gas diffusion media layer 16. Bipolar plates may be provided to receive a portion of the second catalyst coated gas diffusion media layer 26 and to receive a portion of the first catalyst coated gas diffusion media layer 16 and the first proton exchange membrane layer 18, so that the bipolar plates engage the seal 19 to trap the reactant gases between the bipolar plates. In the alternative, the seal 19 may extend a distance sufficient to cover the second catalyst coated gas diffusion media layer 26 and the first catalyst coated gas diffusion media layer 16 and the first proton exchange membrane layer 18.

Figure 5:
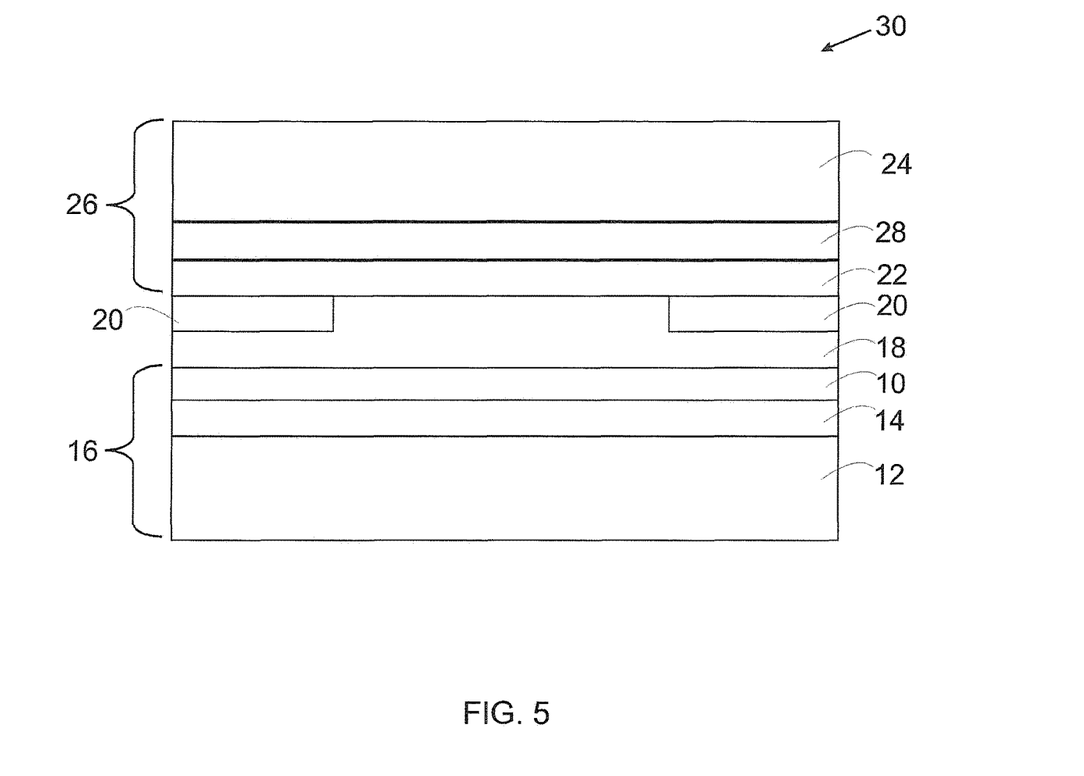
FIG. 5 is a cross-sectional view of a membrane electrode assembly, according to one embodiment of the invention.

In one embodiment not shown, the subgasket 20 of product 30 shown in FIG. 5 may also extend past the edge of the first proton exchange membrane layer 18 and the subgasket 20 may include an elastomer seal 19.

In one embodiment, the first catalyst coated gas diffusion media layer 16 is the cathode gas diffusion media layer and the second catalyst coated gas diffusion media layer 26 is the anode gas diffusion media layer. In another embodiment, the first catalyst coated gas diffusion media layer 16 is the anode gas diffusion media layer and the second catalyst coated gas diffusion media layer 26 is the cathode gas diffusion media layer. As is known in the art, the gas diffusion media layers 12 and 24 provide gas transport to the catalyst layers 10 and 22, respectively, and the optional microporous layers 14 and 28 are hydrophobic layers that assist in the management of water away from the proton exchange membrane(s).

Figure 6:
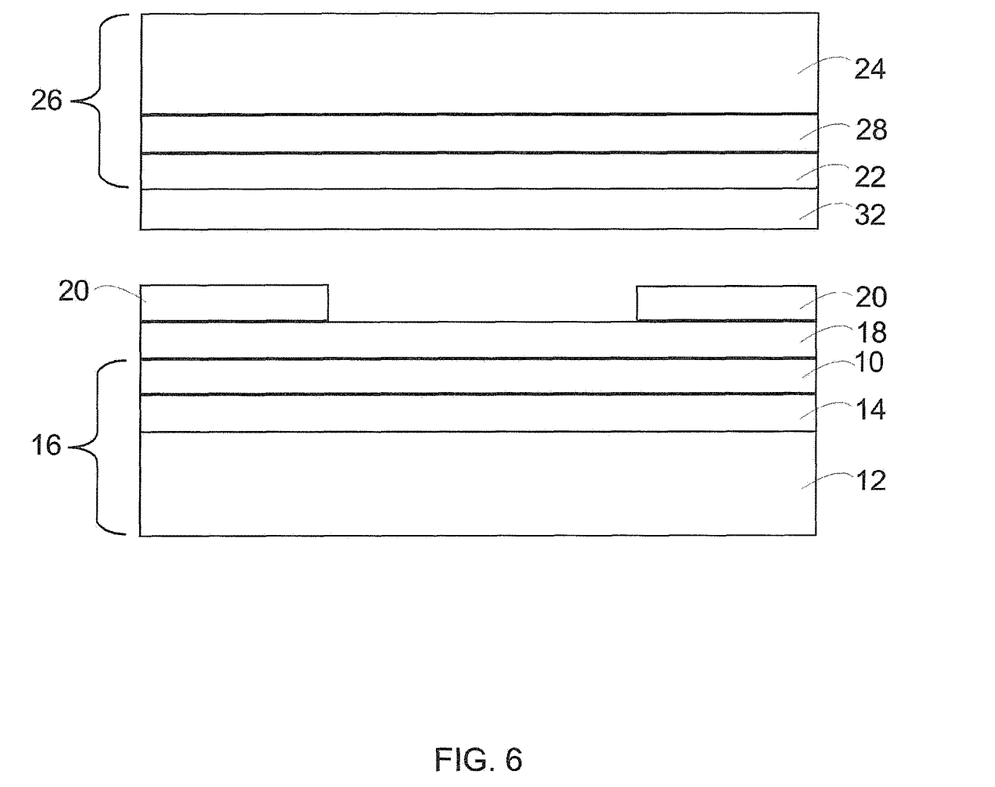
FIG. 6 illustrates a method according to one embodiment of the invention.

In another embodiment shown in FIG. 6, a second wet proton exchange membrane layer is deposited over the second catalyst coated diffusion media layer 26. The forming of the second wet proton exchange membrane may include any suitable technique, for example casting, laminating or imbibing. The second wet proton exchange membrane may include a support or reinforcing sheet, for example a sheet of porous material, for example expanded polytetrafluoroethylene (ePTFE) or Teflon. In another embodiment, the second wet proton exchange membrane may include a support including one of a porous material less than 30 µm thick, a paper less than 30 µm thick, polyolefins, polyethylene, polypropylene, polyesters, polyphenylene sulfide, or polymers with crystalline melting temperatures which do not dissolve in the coating solvents or dispersants used to imbibe an ionomer into the support material. In one embodiment, the forming comprises casting, wherein a reinforcing sheet is evenly deposited over the catalyst layer 22 and an ionomer solution is applied over the reinforcing sheet. The ionomer solution may be, but is not limited to, an ionomer dispersion including Nafion 1000 in 40 wt % 1-propanol and 60 wt % water. The ionomer solution may infiltrate or fill the pores of the reinforcing sheet. The ionomer solution may also penetrate at least one of the catalyst layer 22 and the microporous layer 28. In one embodiment, the ionomer solution may be heated to flash off the solvents and provide a dried solid polymer membrane reinforced by the ePTFE.

In another embodiment, the forming of the second wet proton exchange membrane comprises laminating or imbibing, wherein the reinforcing sheet is immersed in the ionomer solution to form a wet membrane, and then this wet reinforced membrane is evenly deposited over the catalyst layer 22.

The second wet proton exchange membrane layer may be dried, for example under low pressure, to form a second proton exchange membrane layer 32.

Figure 7:
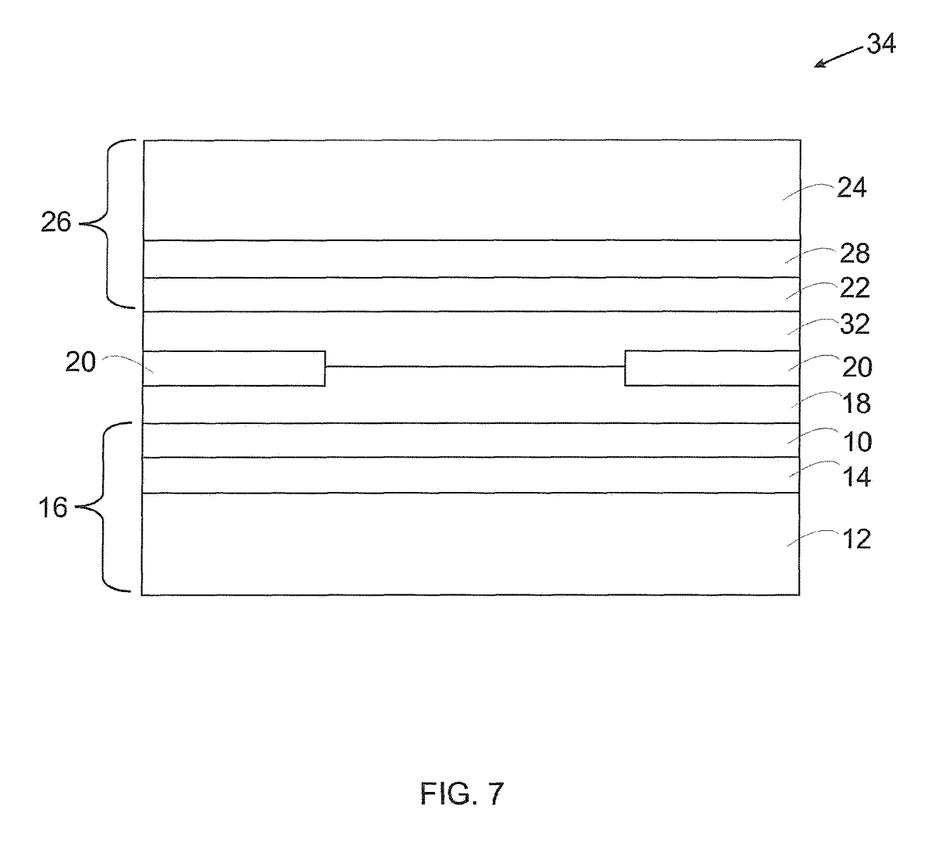
FIG. 7 is a cross-sectional view of a membrane electrode assembly, according to one embodiment of the invention.

A subgasket 20 may be deposited over the first proton exchange membrane layer 18, as shown in FIG. 6. In one embodiment not shown, the subgasket 20 of FIG. 6 may extend past the edge of the first proton exchange membrane layer 18 and the subgasket 20 may include an elastomer seal 19. In another embodiment, the subgasket 20 is deposited over the second proton exchange membrane layer 32. In one embodiment, the layers are assembled wet. In another embodiment, the first dried proton exchange membrane layer 18 formed over the first catalyst coated gas diffusion media layer 16 and the second dried proton exchange membrane layer 32 formed over the second catalyst coated gas diffusion media layer 26 are hot pressed together. Alternatively, individual sheets may be cut into at least two pieces before hot pressing. The hot pressing results in the product 34 shown in FIG. 7. In this embodiment, a portion of the second ionically conductive membrane layer 32 overlies the subgasket 20 and a portion of the first ionically conductive proton exchange membrane layer 18 underlies the subgasket 20. In another embodiment, the subgasket 20 is not deposited over the first proton exchange membrane layer 18 or the second proton exchange membrane layer 32 before hot pressing. In one embodiment, the product 34 may be cut into at least two portions. In one embodiment not shown, the subgasket 20 of FIG. 7 may also extend past the edge of the first proton exchange membrane layer 18 and the subgasket 20 may include an elastomer seal 19.

The following examples illustrate various embodiment of the invention.

Example 1

Carbon fiber paper available from Toray Industries, Inc. was coated with a microporous layer (containing Teflon emulsion), was sintered at 350° C., and then was coated with a dispersion of platinum on carbon (Tanaka) in a liquid ionomer solution. The multilayer coated carbon fiber paper was heated on an 80° C. platen and an ionomer dispersion (Nafion 1000 in 40 wt. % 1-propanol and 60-wt % water) was applied using an Erichsen coater operated at 12.5-mm/sec with a Bird applicator having a 12-mil coating gap. The ionomer coating was allowed to dry for 1 hour at 80° C. The composite was then heated at 130° C. for two hours. A second piece of catalyst-coated gas diffusion layer with a microporous layer was placed on top of the dried ionomer (with the catalyst facing towards the ionomer film layer) with a subgasket of Kapton film between, and the composite was hot pressed at between 320 and 350° F. for six minutes at between 20 and 300 pounds per square inch pressure. After cooling to room temperature, the resultant composite was evaluated as a membrane electrode assembly in a fuel cell.

Example 2

Carbon fiber paper from Toray was coated with a microporous layer (containing Teflon emulsion), was sintered at 350° C., and then was coated with a dispersion of platinum on carbon (Tanaka) in a liquid ionomer solution. The multilayer was then heated at 120° C. for 30 minutes. The multilayer coated carbon fiber paper was then heated with the catalyst side up on an 80° C. platen, and expanded Teflon membrane (Donaldson Tetratex 1316) was spread evenly on top of the catalyst layer of the carbon paper support. Ionomer dispersion (Nafion 1000 in 40 wt. % 1-propanol and 60-wt % water) was then applied using an Erichsen coater operated at 12.5-mm/sec with a Bird applicator having a 12-mil coating gap. The ionomer coating dried at 80° C. for 1 hour and then at 130° C. for 2 hours. Then a second sheet of catalyst-coated diffusion media with a microporous layer was laid on top of the dried ionomer coated gas diffusion layer with the catalyst layer side of the carbon fiber paper facing towards the coated ionomer layer. The composite aA4 was then hot pressed at between 320 and 350° F. for six minutes at between 20 and 300 pounds per square inch pressure After cooling to room temperature, the resultant composite was evaluated as a membrane electrode assembly in a fuel cell.

Example 3

An expanded Teflon membrane (Donaldson Tetratex 1316) was immersed in ionomer dispersion (Nafion 1000, DE2020, available from DuPont de Nemours), and then the wet membrane was spread evenly on top of the catalyst layer that had previously been coated on top of a sintered Teflon microporous layer situated on a Toray carbon fiber paper support (030), prepared as described in Example 1. The composite was then heated on an 80° C. platen of an Erichsen coater. A second layer of carbon fiber diffusion media with microporous layer and catalyst layer was applied to the ionomer-imbibed ePTFE layer with the catalyst layer facing towards the ionomer layer. The composite was then hot pressed at between 320 and 350° F. for six minutes at between 20 and 300 pounds per square inch pressure. The resultant composite was used as a membrane electrode assembly in a hydrogen airfuel cell.

Example 4

Multiple coatings of ionomer can be successively applied to the carbon fiber support prepared as in Examples 1 and 2, until the desired ionomer membrane thickness is realized.

Example 5

More than one layer of ionomer imbibed expanded tetra-fluoroethylene membrane from Donaldson can be applied to the ionomer layer prepared as in Example 3. The multiple layers of ePTFE are arranged such that the machine and transverse directions of the ePTFE layers are placed diagonally to each other to improve the strength of the composite. Alternatively or additionally, one or more coatings of ionomer dispersion can be applied to the ionomer layer in Example 3 until the desired dried ionomer membrane thickness is obtained.

Example 6

An expanded Teflon membrane (Donaldson Tetratex 1316) was immersed in ionomer dispersion (Nafion 1000, DE2020, available from DuPont de Nemours), and then the wet membrane was spread evenly on top of glass. A layer of carbon fiber diffusion media was applied to the wet ionomer-imbibed, expanded-polyetrafluoroethylene membrane. The carbon fiber (Toray 030) had a platinum on carbon, catalyst layer that had previously been coated on top of a sintered Teflon microporous layer that was prepared as described in Example 1. The composite was then heated on an 80° C. platen of an Erichsen coater. When completely dry, the ionomer and diffusion media composite was removed from the glass by immersion in water until the composite released from the glass support. Another layer of ionomer dispersion was applied to the first ionomer layer on the carbon fiber diffusion media using a 12-mil gap Bird Applicator, and the composite was heated on the platen of an Erichsen coater that was set at 80° C. The composite was Then heated stepwise from 80° C. to 120° C. and then was maintained at 120° C. for four hours. A second layer of carbon fiber diffusion media with microporous layer and catalyst layer was then applied to the ionomer layer with the catalyst layer facing towards the ionomer layer. The multi-layer composite was then hot pressed at between 320 and 350° F. for six minutes at between 20 and 300 pounds per square inch pressure. The resultant composite was then used as a membrane electrode assembly in a hydrogen air fuel cell.

When the terms "over", "overlying", "overlies" or the like are used herein with respect to the relative position of layers to each other, such shall mean that the layers are in direct contact with each other or that another layer or layers may be interposed between the layers.

The description of the invention is merely exemplary in nature and, thus, variations thereof are not to be regarded as a departure from the spirit and scope of the invention.

What is claimed is:

1. A method comprising:
   providing a first catalyst coated gas diffusion media layer comprising a first catalyst coating over a gas diffusion media layer;
   depositing a wet first proton exchange membrane layer over the first catalyst coated gas diffusion media layer; and
   providing a second catalyst coated gas diffusion media layer comprising a second catalyst coating over a second gas diffusion media layer, the second catalyst coated gas diffusion layer being disposed onto the wet first proton exchange membrane layer
   wherein the first and second catalyst coated gas diffusion media layers each further includes a microporous layer with a hydrophobic material operatively configured to repel moisture in the first and second catalyst coated gas diffusion media layers.

2. The method as set forth in claim 1 further comprising interposing a subgasket material over the wet first proton exchange membrane layer before contacting the second catalyst coated gas diffusion media layer with the wet first proton exchange membrane layer.

3. The method as set forth in claim 1 further comprising the step of hot pressing the wet first proton exchange membrane layer formed over the first catalyst coated gas diffusion media layer together with the second catalyst coated gas diffusion media layer.

4. The method as set forth in claim 2 wherein the subgasket material extends past the edge of the first proton exchange membrane layer.

5. The method as set forth in claim 4 wherein the subgasket material further comprises an elastomer seal.

6. The method as set forth in claim 4 further comprising the step of hot pressing together the first wet proton exchange membrane layer formed over the first catalyst coated gas diffusion media layer, and the interposed sub-gasket material, and the second catalyst coated gas diffusion media layer.

7. A method comprising the steps of:
  providing a first catalyst coated gas diffusion media layer comprising a first catalyst coating over a gas diffusion media layer, the first catalyst coating being a catalyst decal substrate; and
  depositing a wet first proton exchange membrane layer over the first catalyst coated gas diffusion media layer.

8. The method as set forth in claim 7 further comprising the step of providing a second catalyst coated gas diffusion media layer comprising a second catalyst coating over a second gas diffusion media layer, the second catalyst coated gas diffusion layer being disposed onto the wet first proton exchange membrane layer.

* * * * *